US007090425B2

United States Patent
Bohne et al.

(10) Patent No.: US 7,090,425 B2
(45) Date of Patent: Aug. 15, 2006

(54) BALLJOINT

(75) Inventors: Manfred Bohne, Quernheim (DE); Jürgen Gräber, Stemwede-Dielingen (DE); Manfred Heidemann, Belm-Vehrte (DE); Guido Remme, Bramsche (DE); Hans Prins, Damme (DE)

(73) Assignee: ZF Lemförder Metallwaren AG, (DE)

( * ) Notice: Subject to any disclaimer, the term of this patent is extended or adjusted under 35 U.S.C. 154(b) by 0 days.

(21) Appl. No.: 10/433,866

(22) PCT Filed: Sep. 27, 2002

(86) PCT No.: PCT/DE02/03661

§ 371 (c)(1),
(2), (4) Date: Jun. 4, 2003

(87) PCT Pub. No.: WO03/031834

PCT Pub. Date: Apr. 17, 2003

(65) Prior Publication Data

US 2004/0057781 A1    Mar. 25, 2004

(30) Foreign Application Priority Data

Oct. 4, 2001    (DE) .......................... 201 16 358 U

(51) Int. Cl.
*F16C 11/00*    (2006.01)

(52) U.S. Cl. ...................... 403/135; 403/122; 403/133; 403/134

(58) Field of Classification Search ................. 403/76, 403/122, 132–135; 280/93.511, 93.51
See application file for complete search history.

(56) References Cited

U.S. PATENT DOCUMENTS

| 4,504,166 | A | * | 3/1985 | Morin ........................ 403/147 |
| 5,066,159 | A | | 11/1991 | Urbach |
| 5,154,530 | A | | 10/1992 | Dresselhouse |
| 5,601,378 | A | * | 2/1997 | Fukukawa et al. .......... 403/140 |
| 5,653,545 | A | | 8/1997 | Moormann et al. |
| 5,678,947 | A | | 10/1997 | Urbach et al. |
| 5,752,780 | A | * | 5/1998 | Dorr ........................... 403/135 |
| 2003/0077114 | A1 | * | 4/2003 | Bröker et al. ................ 403/135 |

FOREIGN PATENT DOCUMENTS

| DE | 100 05 979 | | 8/2001 |
| WO | WO 01/59312 | * | 8/2004 |

* cited by examiner

*Primary Examiner*—Daniel P. Stodola
*Assistant Examiner*—Michael P. Ferguson
(74) *Attorney, Agent, or Firm*—McGlew & Tuttle, PC

(57) ABSTRACT

The present invention pertains to a ball-and-socket joint, especially for steering mechanisms and/or wheel suspensions of motor vehicles, with a ball pivot (1), which is accommodated rotatably and tiltably in a one-part or multipart bearing shell (4) within a joint housing (7), wherein the bearing shell (4) is fixed in the joint housing by a closing ring (9), wherein a metallic compressible element (18), which provides a sealing contact surface between the joint housing (7) and the closing ring (9) in the assembled state of the ball-and-socket joint, is arranged between the closing ring (9) and the joint housing (7).

23 Claims, 3 Drawing Sheets

BALLJOINT

FIELD OF THE INVENTION

The present invention pertains to a ball-and-socket joint, especially for steering mechanisms and/or wheel suspensions of motor vehicles, with a pivot pin, which is accommodated rotatably and tiltably in a one-part or multipart bearing shell within a joint housing, wherein the bearing shell is fixed in the joint housing by a closing ring.

BACKGROUND OF THE INVENTION

Various designs and sizes of ball-and-socket joints of this type described in the introduction are used in large numbers in all industrial areas, especially also in the automobile industry. Such ball-and-socket joints are usually manufactured by first inserting the bearing shell together with the pivot pin in the joint housing through a mounting opening. The joint housing is subsequently closed by a closing ring, which is connected to the joint housing in a positive-locking manner by means of a rolling operation. The problem that the closing ring, which shall also position the bearing shell in the joint housing in a nonrotatable manner at the same time, will not come into contact with a shoulder of the joint housing, which is provided for that purpose, due to existing tolerances, will sometimes occur during the mounting steps described, especially concerning the connection between the closing ring and the joint housing. This problem inevitably leads to the formation of a housing gap, through which moisture as well as contaminants may possibly enter the interior of the joint ball after the completion of the manufacturing process, because the positive-locking connection established by the rolling operation between the closing ring and the joint housing cannot assume an absolute sealing function. Penetrating moisture as well as contaminants lead to increased friction in the ball-and-socket joint and possibly reduce the service life of the ball-and-socket joint affected in an extremely lasting manner.

SUMMARY OF THE INVENTION

Based on the described drawbacks of the state of the art, the object of the present invention is to rule out a reduction of the service life as a consequence of penetrating moisture and contaminants and to achieve an improved tolerance compensation during the mounting of the ball-and-socket joint in a ball-and-socket joint of this class by an improved sealing protection between the closing ring and the joint housing.

According to the invention, a ball-and-socket joint is provided, especially for steering mechanisms and/or wheel suspensions of motor vehicles. The joint has a pivot pin, which is accommodated rotatably and tiltably in a one-part or multipart bearing shell within a joint housing. The bearing shell is fixed by a closing ring in the joint housing. A metallic compressible element provides a sealing contact surface between the joint housing and the closing ring in the assembled state of the ball-and-socket joint. The metallic compressible element is arranged between the closing ring and the joint housing.

The technical teaching disclosed is characterized especially in that the metallic compressible element, which ensures a sealing contact surface between the joint housing and the closing ring in the assembled state of the ball-and-socket joint, is arranged between the closing ring and the joint housing. The compressible element mentioned is deformed during the pressing-in operation to establish the positive-locking connection between the joint housing and the closing ring such that a metallic contact is always established between the components of the ball-and-socket joint to be connected to one another under all given tolerance conditions. Moreover, an additional axial support of the closing ring on the joint housing can be brought about because of the special shape of the compressible element.

It proved to be especially advantageous for accomplishing the object to design the compressible element as a sealing lip extending concentrically peripherally. The peripheral sealing lip is arranged projectingly at an axial cross-sectional area of the closing ring or of the housing. This design makes possible an especially simple manufacture of the compressible element, because this can be formed together with the joint housing or the closing ring in one operation. The deformability of the compressible element and the sealing action resulting therefrom can be optimized by the compressible element designed as a sealing lip being designed to have such a cross-sectional shape that its width is very much smaller than the height projecting over the axial cross-sectional area.

The compressible element itself may be arranged both at the closing ring and at the joint housing, depending on what other geometric conditions that are to be taken into account during the manufacture and the mounting.

An exemplary embodiment of the subject of the present invention will be explained in greater detail below. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
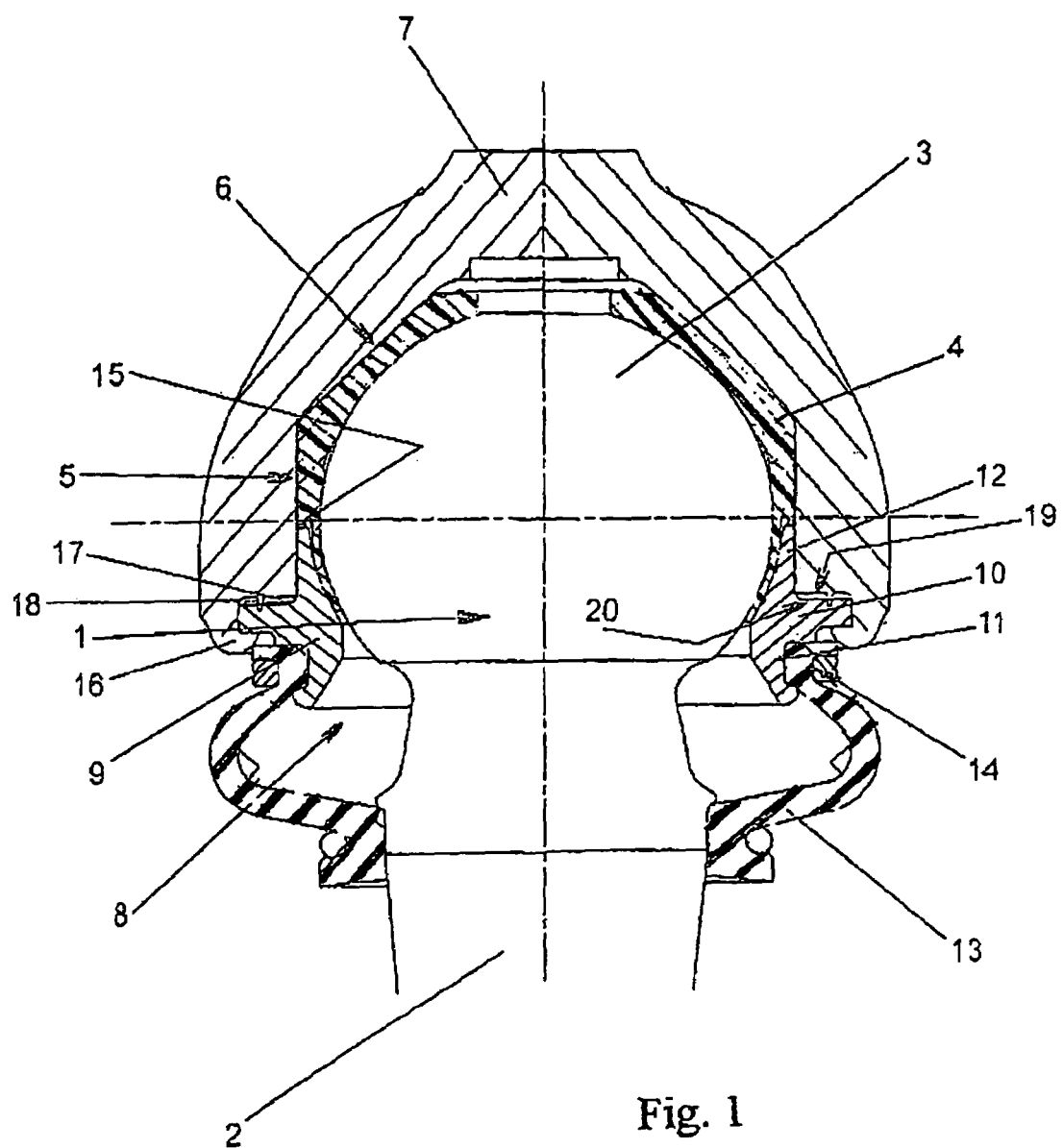
FIG. 1 is a longitudinal sectional view through a ball-and-socket joint according to the present invention.

Referring to the drawings in particular, the ball-and-socket joint shown in FIG. 1 comprises a pivot pin 1, which has in the known manner a pivot area 2 and a joint ball 3 made in one piece with it. The pivot pin 1 is mounted with its joint ball 3 in a bearing shell 4 made of an elastic material. The inner contour of the bearing shell 4 is adapted to the joint ball 3. The bearing shell 4 has on its outer contour a cylindrical jacket surface 5 as well as a jacket surface 6, which forms an angle of about 45° in relation to the cylindrical jacket surface 5. With the jacket surfaces 5 and 6 the bearing shell 4 is accommodated in a joint housing 7. The joint housing 7 is closed at the upper, joint ball-side end of the pivot pin 1 and has on its opposite side an opening 8, through which the bearing shell 4 can be introduced into the joint housing 7 together with the pivot pin 1. Once the components mentioned have been mounted in the place intended for them during the manufacturing operation, the opening 8 of the joint housing 7 is closed by means of a closing ring 9.

The closing ring 9 has a rotationally symmetrical form with an annular core area 10 as well as two end areas 11 and 12 of different shapes. The two end areas 11 and 12 project in the direction of the pivot area 2 as well as the area of the joint ball 3. The end area 11 is used to receive a sealing or rubber bellows 13, which is accommodated in a peripheral groove 14 of the closing ring 9 and is used to seal the pivot area 2 against the joint ball area 3 within the joint housing 7.

The opposite end area 12 is in contact with a peripheral shoulder of the bearing shell 4 with its free end designed as a shoulder 15 and fixes same within the joint housing 7 in the axial direction. During the mounting of the pivot pin 1 together with the bearing shell 4 in the joint housing 7, the closing ring 9 closes the opening 8 after the introduction of the aforementioned components and is fixed within the joint housing 7 by means of a suitable pressing-in or rolling tool. A peripheral rolled edge 16, with which a surface of the outwardly projecting core area 10 of the closing ring 9 comes into contact, is prepared at the lower end of the joint housing facing the pivot area 2 within the framework of the rolling operation. The axial fixation of the closing ring 9 in the opposite axial direction is performed as described above by bringing the closing ring 9 into contact with the shoulder of the bearing shell 4.

As is apparent from FIG. 1, a gap 17, which is closed according to the present invention by means of a compressible element 18, is present between the joint housing 7 and the closing ring 9 after the mounting. The compressible element 18 is part of the joint housing 7 and projects over an axial sealing and radially extending cross-sectional area 19. As an alternative to this, the compressible element may also be arranged at the opposite axial sealing radially extending surface 20 of the closing ring 9. An essential task of the compressible element 18 is to seal the gap 17 between the joint housing 7 and the closing ring 9. This is achieved by the metallic contact of the compressible element with the particular axial surface located opposite, which is in turn brought about by a slight deformation of the compressible element within the framework of the rolling operation during the closing of the ball-and-socket joint.

Figure 2:
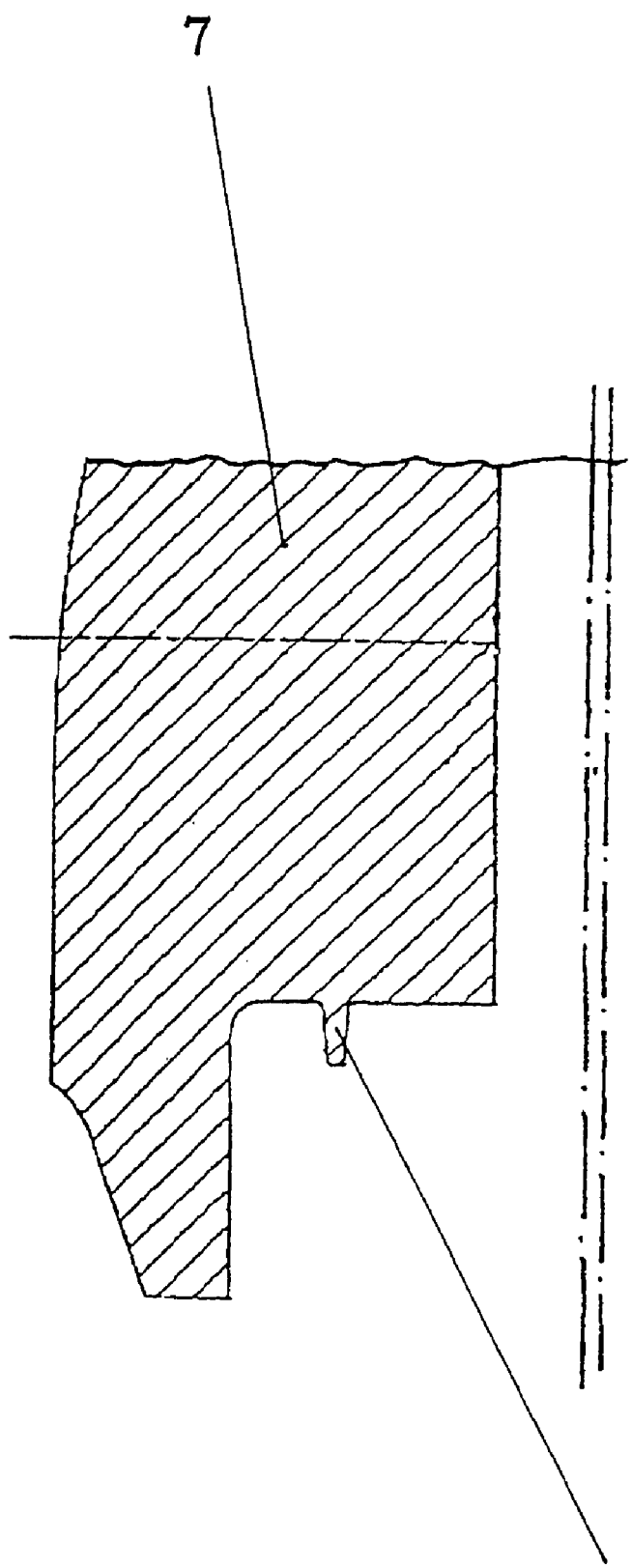
FIG. 2 is an enlarged view of the partial area according to the present invention from FIG. 1.
Figure 3:
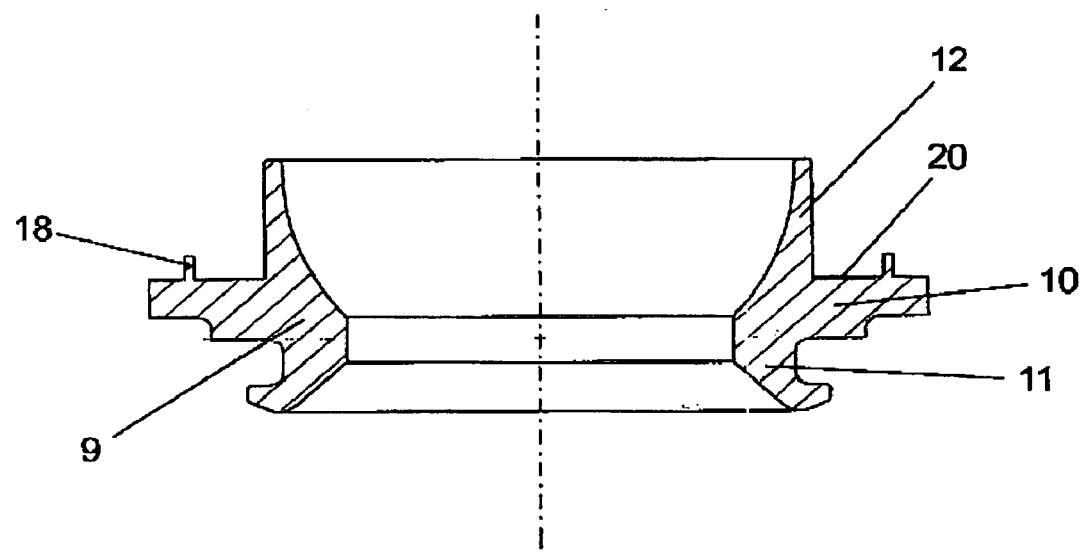
FIG. 3 is a sectional view of a closing ring with a compressible element formed as a part thereof.

The special shape of the compressible element 18 becomes clear from the detail in FIG. 2. The compressible element 18 has the shape of a sealing lip, whose width is substantially smaller than the height projecting over the radially extending cross-sectional area 19 of the joint housing 7. Due to this geometric shape and the selected height of the sealing lip or compressible element 18, due to which the closing ring 9 comes into contact first at the sealing lip or compressible element 18 and with the shoulder 15 of the bearing shell 4 only thereafter after the deformation of the sealing lip or compressible element 18 within the framework of the rolling operation during the manufacture, a metallic stop is always guaranteed between the joint housing 7 and the closing ring 9 and a sealing function is thus brought about. Due to the small width of the compressible element 18, no special additional force is needed for the deformation of the compressible element 18, which deformation of the compressible element 18 is necessary during the rolling operation.

While specific embodiments of the invention have been shown and described in detail to illustrate the application of the principles of the invention, it will be understood that the invention may be embodied otherwise without departing from such principles.

The invention claimed is:

1. A ball-and-socket joint, comprising:
a joint housing having a cross sectional area with a surface;
a bearing shell disposed in said housing;
a ball pivot with a ball and a pivot portion, said ball being accommodated rotatably and tiltably in said bearing shell within said joint housing;
a closing ring having a surface substantially parallel to said cross sectional area surface, said bearing shell being fixed by said closing ring in said joint housing;
a metallic compressible element formed as a part of said joint housing, said metallic compressible element providing a sealing contact surface between said joint housing and said closing ring, said metallic compressible element being arranged between said closing ring surface and said cross sectional area surface.

2. A ball-and-socket joint in accordance with claim 1, wherein said compressible element comprises a peripheral sealing lip connected to said joint housing.

3. A ball-and-socket joint in accordance with claim 2, wherein said peripheral sealing lip is arranged projectingly at a said cross-sectional area of said joint housing.

4. A ball-and-socket joint in accordance with claim 2, wherein the cross-sectional shape of said sealing lip is designed such that its width is very much smaller than its height projecting over a cross-sectional area of said sealing lip.

5. A ball-and-socket joint in accordance with claim 1, wherein said compressible element is arranged as a projection formed integral with said housing and extending axially from a said surface of said joint housing.

6. A ball-and- socket joint in accordance with claim 1, wherein said joint housing has a cross sectional area with a surface perpendicular to an axial direction of said housing and said closing ring has a surface facing said cross sectional area surface and perpendicular to the axial direction of said housing, said metallic compressible element being arranged between said closing ring surface and said cross sectional area surface.

7. A ball-and-socket joint in accordance with claim 1, wherein:
said joint housing defines an opening with said ball pivot extending through said opening;
said surface of said joint housing is perpendicular to an axial direction of said housing and facing said opening;
said surface of said closing ring faces said cross sectional area surface and is perpendicular to the axial direction of said housing.

8. A ball-and-socket joint, comprising:
a joint housing defining an opening and having a cross sectional area with a radially extending surface facing said opening;
a bearing shell disposed in said housing;
a ball pivot with a ball and a pivot portion, said ball being accommodated rotatably and tiltably in said bearing shell within said joint housing, said ball pivot extending through said opening;
a closing ring, said bearing shell being fixed by said closing ring in said joint housing, said closing ring having a radially extending surface substantially parallel to said radially extending surface of said cross sectional area;
a metallic compressible element providing a sealing contact surface between said joint housing and said closing ring, said metallic compressible element being arranged between said closing ring surface and said radially extending surface of said cross sectional area.

9. A ball-and-socket joint in accordance with claim 8, wherein said compressible element is formed integral with said housing and extending axially from said cross sectional area radially extending surface.

10. A ball-and-socket joint in accordance with claim 9, wherein a gap is provided between said closing ring surface and said cross sectional area surface, said metallic compressible element being arranged in said gap, said metallic compressible element being axially deformed in said gap.

11. A ball-and-socket joint in accordance with claim 8, wherein said metallic compressible element has a shape of a sealing lip having a width substantially smaller than a height of said compressible element extending from said cross sectional area surface and said closing ring contacts a shoulder of said bearing shell.

12. A ball-and-socket joint in accordance with claim 8, wherein said metallic compressible element extends axially from said radially extending surface of said cross sectional area.

13. A ball-and-socket joint in accordance with claim 12, wherein a gap is provided between said closing ring surface and said radially extending surface of said cross sectional area, said metallic compressible element being arranged in said gap.

14. A ball-and-socket joint in accordance with claim 12, wherein said metallic compressible element is formed as part of said dosing ring.

15. A ball-and-socket joint, comprising:
a joint housing defining an opening;
a bearing shell disposed in said housing;
a ball pivot with a ball and a pivot portion, said ball being accommodated rotatably and tiltably in said bearing shell within said joint housing;
a closing ring, said bearing shell being fixed by said closing ring in said joint housing;
a metallic compressible element providing a sealing contact surface extending between a surface of said closing ring and a surface of said housing, said compressible element being deformed in an axial direction between said surface of said joint housing and said surface of said closing ring to restrict the passage of moisture and contaminants between said surface of said joint housing and said surface of said closing ring;
wherein said joint housing has a cross sectional area with a surface and said closing ring has a surface substantially parallel to said cross sectional area surface, said metallic compressible element being arranged extending in an axial direction between said closing ring surface and said cross sectional area surface to restrict passage of moisture and contaminants in a radial direction between said cross sectional area surface and said closing ring surface.

16. A ball-and-socket joint in accordance with claim 15, wherein a gap is provided between a closing ring surface and a cross sectional area surface of said housing, said metallic compressible element being arranged in said gap, wherein said metallic compressible element has a shape of a sealing lip having a width substantially smaller than a height of said compressible element extending from said cross sectional area surface and said closing ring contacts a shoulder of said bearing shell.

17. A ball-and-socket joint in accordance with claim 15, wherein said compressible element is formed integral with said housing and extends axially from said cross sectional area surface.

18. A ball-and-socket joint, comprising:
a joint housing having a cross sectional area with a surface perpendicular to an axial direction of said housing;
a bearing shell disposed in said housing;
a ball pivot with a bail and a pivot portion, said ball being accommodated rotatably and tiltably in said bearing shell within said joint housing;
a closing ring having a surface facing said cross sectional area surface and perpendicular to the axial direction of said housing, said bearing shell being fixed by said closing ring in said joint housing;
a metallic compressible element formed as a part of said joint housing, said metallic compressible element providing a scaling contact surface between said joint housing and said closing ring, said metallic compressible element being arranged between said closing ring surface and said cross sectional area surface.

19. A ball-and-socket joint in accordance with claim 18, wherein:
said joint housing defines an opening with said ball pivot extending through said opening; and
said cross sectional area surface faces said opening.

20. A ball-and-socket joint in accordance with claim 18, wherein a gap is provided between said closing ring surface and said cross sectional area surface, said metallic compressible element being arranged in said gap.

21. A ball-and-socket joint in accordance with claim 20, wherein said metallic compressible element has a shape of a sealing lip having a width substantially smaller than a height of said compressible element extending from said cross sectional area surface and said closing ring contacts a shoulder of said bearing shell.

22. A ball-and-socket joint, comprising:
a joint housing defining an opening and having a cross sectional area with a radially extending surface facing said opening;
a bearing shell disposed in said housing;
a ball pivot with a ball and a pivot portion, said ball being accommodated rotatably and tiltably in said bearing shell within said joint housing, said ball pivot extending through said opening;
a closing ring, said bearing shell being fixed by said dosing ring in said joint housing, said closing ring having a radially extending surface facing said radially extending surface of said cross sectional area,
a metallic compressible element providing a sealing contact surface between said joint housing and said closing ring, said metallic compressible element being arranged between said closing ring surface and said radially extending surface of said cross sectional area said metallic compressible element being formed as part of said closing ring and extending axially from said radially extending surface of said closing ring.

23. A ball-and-socket joint in accordance with claim 22, wherein a gap is provided between said radially extending surface of said closing ring and said radially extending surface of said cross sectional area, said metallic compressible element being arranged in said gap.

* * * * *